United States Patent [19]

Hostetter

[11] Patent Number: 4,559,410

[45] Date of Patent: Dec. 17, 1985

[54] ACCESS PANEL

[75] Inventor: David L. Hostetter, Jasper, Ind.

[73] Assignee: Kimball International, Inc., Jasper, Ind.

[21] Appl. No.: 584,327

[22] Filed: Feb. 28, 1984

[51] Int. Cl.$^4$ ............................................. H02G 3/00
[52] U.S. Cl. ..................................................... 174/48
[58] Field of Search ............... 174/48, 49; 160/127, 160/135, 351; 52/220, 221, 239, 173 R; 339/22 R, 23

[56] References Cited

U.S. PATENT DOCUMENTS

| 3,856,981 | 12/1974 | Boundy | 174/48 |
| 4,278,834 | 7/1981 | Boundy | 174/48 |
| 4,367,370 | 1/1983 | Wilson et al. | 174/48 |
| 4,375,010 | 2/1983 | Mollenkopf | 174/48 |
| 4,377,724 | 3/1983 | Wilson | 174/48 |

Primary Examiner—Laramie E. Askin
Assistant Examiner—D. A. Tone
Attorney, Agent, or Firm—Albert L. Jeffers; John F. Hoffman

[57] ABSTRACT

A partition member of a space-divider wall system having an accessible panel compartment for mounting a plurality of junction boxes and organizing data cable terminal end connections. A displaceably mounted front wall provides user access to the compartment. A plurality of support plate members are cooperatively releasably mounted on an interior compartment wall. An electrical junction box provides connections of building service to the panel system electrical components. A plurality of communication junction boxes are adhesively attached to one of the support plate members, and data cable terminal ends connected together are releasably retained on another of the support plate members by connector clips. Cables connecting to the junction boxes and the data cables extend to the panel compartment through a raceway positioned along a bottom edge of the partition member.

16 Claims, 5 Drawing Figures

ACCESS PANEL

BACKGROUND OF THE INVENTION

This invention relates generally to space-divider wall systems, and more particularly to an accessible compartment therein providing for arrangement of electrical junction boxes, communication junction boxes and connections of data cable terminal ends that can be easily reconfigured by the user.

Space-divider systems conventionally comprise independent partition members each or some having a raceway in the lower portion thereof adapted for containing and concealing a plurality of cables, and each partition member is usually adapted to connect with one or two adjacent members. Typically, the raceway carries cables throughout the wall system to provide power, telephone and data cable connections. At some point, provisions are made to connect the cables to an external source which might be located in a ceiling, a floor or in an external wall. Often electrical cables of panel members interconnect between adjacent raceways by quick connect plug-in type connectors.

Communication cables extend from central communication panels elsewhere in the building to a convenient entry point in the raceway. Data cable terminal ends must connect together to couple data processing equipment. These data cables extend through the raceway from one computer to another or to peripheral equipment such as printers.

Service or rewiring often is necessary which involves the power, communication or data cables in the raceway. The profusion of cables in the raceway as well as the diverse and often remote location of the appropriate junction box or terminal connection delays isolation of the problem. Repairs and rewiring in such a system, therefore, are difficult, time consuming and expensive. In addition, such space-divider wall systems lack the flexibility and adaptability necessary for a modern office environment.

SUMMARY OF THE INVENTION

The invention in one form thereof overcomes the problems and disadvantages of the prior art by providing a space-divider wall system with a partition member having a spacious, accessible compartment located above the raceway and adapted to contain data cable terminal ends connected together, one or more electrical junction boxes and communication junction boxes, such as for routing telephone and intercom wires. The accessibility of all of the junction boxes and cable terminal end connections expedites rewiring, and facilitates the and isolation of and the correction of any service problems, thereby reducing expense. The centralizing of a plurality of communication junction boxes and a plurality of data cable terminal end connections selectively arranged and releasably mounted in one accessible compartment provides the flexibility and adaptability necessary for a dynamic office partition system.

The partition member has a bottom edge, opposite lateral edges and a lower portion having a compartment. The compartment has an interior with spaced-apart walls, and a displaceably mounted front wall for user access to the compartment. The compartment interior communicates with the raceway. The raceway has relative dimensions to accommodate a plurality of power, communication and data cables and extends across the partition member bottom edge to one or more adjacent partition members each connected edgewise to each of the partition member's respective opposite lateral edges. The raceway opposite lateral edges have openings adapted for the ingress and egress of the cables. An electrical junction box is fixedly mounted on one of the interior compartment walls. Conduit extends from the electrical junction box to the raceway and carries a plurality of power cables from external sources and/or from other partition members in the wall system to the electrical junction box. A plurality of support plate members, each having a front surface and a back surface, have cooperating releasable mounting means for releasably, selectively mounting to one of the interior compartment walls. A plurality of communication junction boxes are adhesively attached to the front surface of one of the support plate members, and a plurality of communication cables connect to each of the communication junction boxes. The communication cables extend to and from the raceway. A plurality of data cables, each with a terminal end selectively, releasably connected together, are releasably attached to the front surface of another of the support plate members. The data cables extend to and from the raceway.

The flexibility and adaptability of this panel system is provided by the cooperating releasable mounting means on the back surface of the support plate members, and by the releasable attachment of the data cable terminal ends to the front surface of one of the support plate members. In the preferred embodiment of the invention, the cooperating releasable mounting means on the back surface of the support plate members comprises two complementary surfaces adapted for interlocking such as a 3M Dual Lok or a heavy duty Velcro. The means for releasably attaching the data cable terminal end connections to the support plate member are cord clips.

It is an object of the invention to provide a partition member having an easily accessible compartment for containing an electrical junction box, a plurality of communication junction boxes and a plurality of data cable terminal ends connected together.

Another object of this invention is to increase the flexibility and adaptability of the space-divider wall system. This is accomplished by releasably mounting the support plate members on an interior compartment wall, as well as by releasably retaining the connected together data cable terminal ends on the front surface of a support plate member.

The above-mentioned and other features and objects of this invention and the manner of attaining them will become more apparent and the invention itself will be best understood by reference to the following description of embodiments of the invention taken in conjunction with the accompanying drawings.

DESCRIPTION OF THE PREFERRED EMBODIMENT

Figure 1:
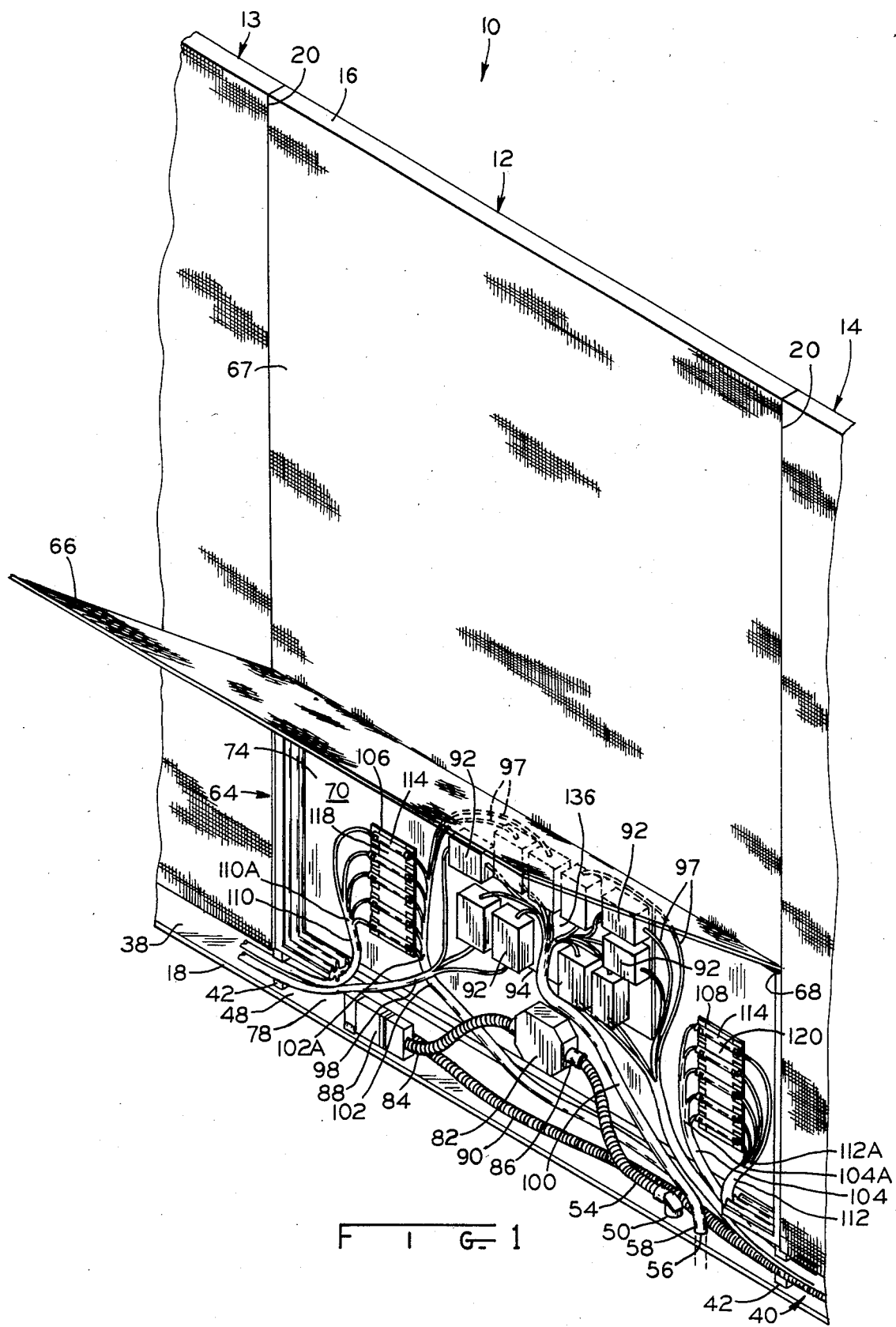
FIG. 1 is a perspective view of a plurality of partition members wherein one of the partition members is provided with an access panel according to the disclosed form of the invention.

In the preferred embodiment, space-divider wall system 10 comprises a plurality of movable, adjacent, interconnected upright prefabricated partition members such as 12, 13 and 14 as illustrated in FIG. 1. Each partition member 12, 13 and 14 includes an internal rigid rectangular frame formed by parallel metal top rails 16 and bottom rails 18 rigidly joined together by parallel metal side rails 20.

Figure 3:
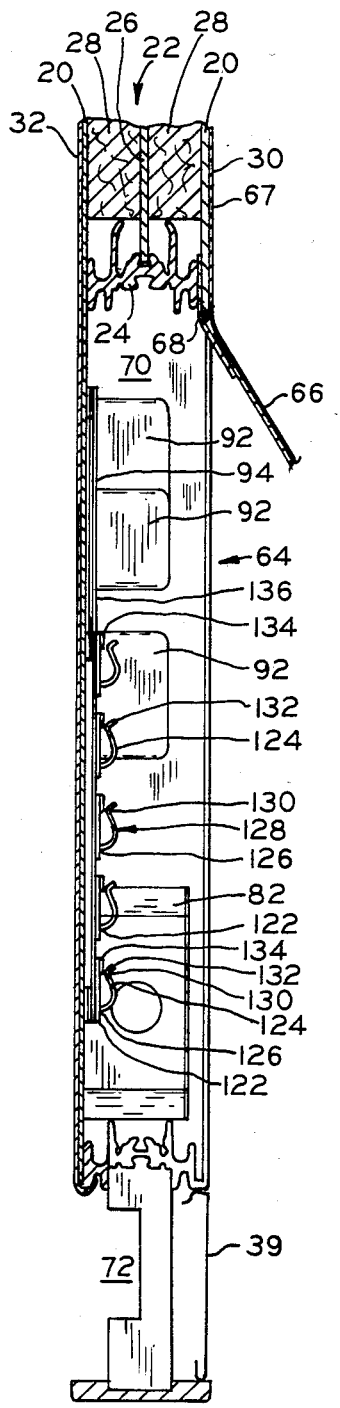
FIG. 3 is a sectional view taken along line 3—3 of FIG. 2, and viewed in the direction of the arrows wherein the internal wiring has been removed.

Side rails 20 are of channel-shaped configuration and open inwardly of the partition member whereby the frame confines therein suitable core structure 22 as shown in FIG. 3. Core structure 22, which is supported by metal channel 24 comprises a center plate 26 sandwiched between sheets of acoustic material 28 such as honeycombed panels. Core 22 is normally covered by thin facing sheets of fabric 30 and 32.

Figure 2:
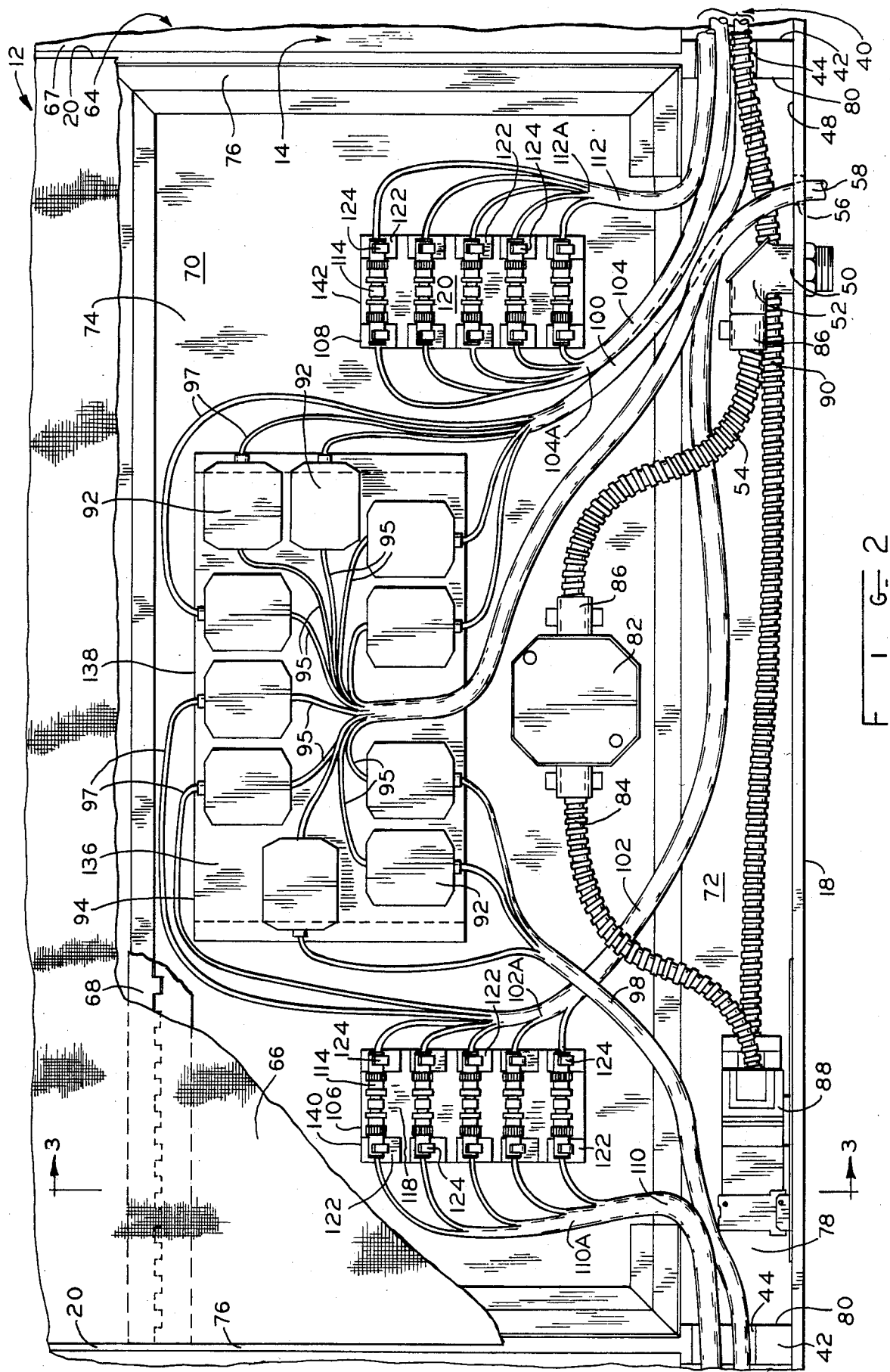
FIG. 2 is a fragmentary front elevational view of the compartment with the front wall broken away.

Partition member 12 has a raceway 38 extending along horizontal bottom rail 18 as shown in FIGS. 1, 2 and 3, raceway 38 including a metal or plastic cover 39. Raceway 38 has adequate dimensions to contain and to conceal a plurality of cables 40 therein. Opposite lateral edges 42 of raceway 38 have openings 44 for the passage of cables between adjacent, interconnected partition members as shown in FIGS. 1 and 2. Bottom 18 of raceway 38 has an opening 50 to accommodate 90° elbow 52, or a straight connector (not shown) for the ingress of electrical cables from conduit (not shown) located in the floor beneath partition 12, and opening 56 adapted for the ingress of communication cables 58 from a remote telephone panel, for example.

Partition member 12 comprises a panel compartment 64 disposed above and contiguous with raceway 38 housing a collection of junction boxes and data cable connections. Compartment front wall 66 is flushed with and hinged to front plate member 67 by a piano hinge 38, for example (FIG. 3) which permits opening of front wall 66 and facilitates access to interior 70 of compartment 64. Compartment interior 70 communicates with interior 72 of raceway 38. Compartment front wall 66, rear wall 74 and side walls 76 and raceway bottom 48, rear wall 78 and lateral edges 80, are preferably made of metal.

A suitable electrical junction box 82 supplies power to wall system 10. Junction box 82, as illustrated in FIGS. 1 and 2, is fixedly attached, as by welding, bonding or screwing to rear wall 74. Electrical conduit 54 carrying a plurality of electrical wires, extends upward from the floor, passes through connector 52 to enter raceway 38, and extends into compartment interior 70 to connect to one side of electrical junction box 82. Electrical conduit 84, connected to the opposite side of electrical junction box 82, carries a plurality of electrical wires and extends downward from compartment interior 70 into raceway 38. Connectors 86 such as standard conduit clamps, connect conduits 54 and 84 to junction box 82 and elbow 52.

Electrical conduit 84 carries a plurality of wire from junction box 82 to power block 88 which can be any commercially available power block adapted for quick connection of power cables from one partition to another. Power cables carried by flexible connector 90 extend from power block 88 through raceway 38 as illustrated in FIG. 1 to electrically connect power block 88 to another power block in an adjacent partition member 14.

One or more of communication junction boxes 92 to make telephone and intercom connections are located in compartment 64. Communication junction boxes 92 are selectively positioned on and fixedly attached to plastic support plate member 94 by an adhesive or other attaching means such as screws. The manner in which support member 94 is cooperatively releasably mounted on rear wall 74 will be explained hereinafter. Main communication trunk 58 comprising 50 pairs of telephone wires, for example, enters raceway 38 through opening 56 and extends upwardly into compartment interior 70 to a central position among mounted communication junction boxes 92 and splits into a plurality of branches 95. Each branch 95 connects to one side of one of the attached communication junction boxes 92. As clearly shown in FIGS. 1 and 2, an individual branch 97 of communication cables 98 and 100 connects to the opposite side of one of the communication junction boxes 92. Communication cables 98 and 100 extend downwardly in compartment interior 70 to enter raceway 38 and pass through openings 44 to adjacent partition members. Cables 98 and 100 will connect to telephone and intercom stations (not shown) throughout the partition system 10.

Figure 4:
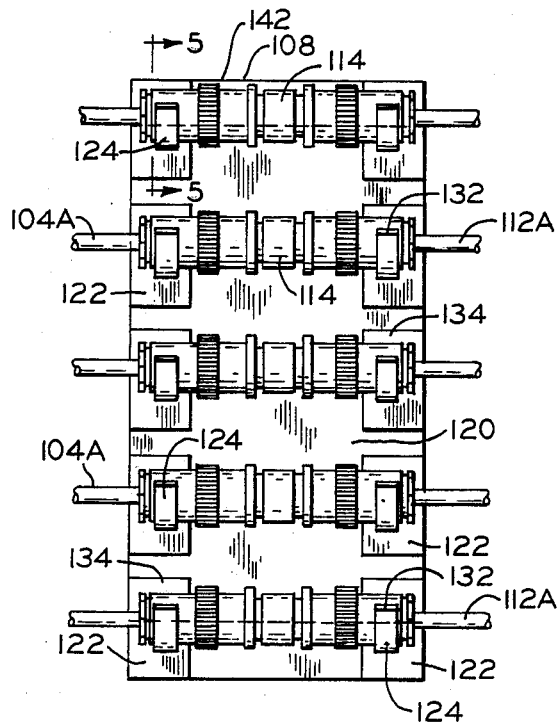
FIG. 4 is an enlarged view showing details of the data cable terminal ends on the support plate panel.

Input data cables 102 and 104 enter partition member 12 through openings 44 in raceway 38 or hole in 18 directly into 12 or horizontally thru raceway cover FIG. 3 and extend into compartment interior 70 to support plate members 106 and 108. Output data cables 110 and 112 extend from support plate members 106 and 108 in compartment interior 70 to enter raceway 38 and pass through openings 44 to adjacent partition members for interconnecting computer equipment and the like. Each of data cables 102, 104, 110 and 112 splits into a plurality of terminal ends 102A, 104A, 110A and 112A. A plurality of conventional computer cable connectors 114, such as BNC or UG-914U computer cable connectors, selectively and releasably join together terminal ends of input data cables 102A and 104A and output data cables 110A and 112A. As clearly shown in FIGS. 2 and 4, terminal ends of cables 102A and 110A are joined together and releasably retained on support plate member 106 and terminal ends of cables 104A and 112A are joined together and releasably retained on support plate member 108.

Figure 5:
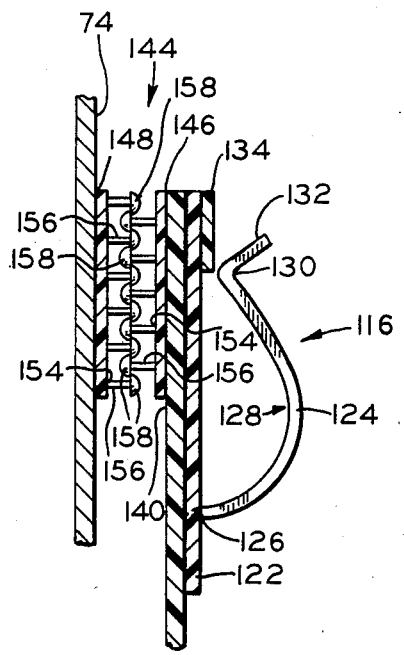
FIG. 5 is a sectional view taken along 5—5 of FIG. 4, and viewed in the direction of the arrows.

Cord clips 116 mounted on front surfaces 118 and 120 of support plate members 106 and 108 provide means for releasably retaining data cable terminal ends 102A, 104A, 110A and 112A on respective support plate members 106 and 108. As shown in FIGS. 3 and 5, each cord clip 116 comprises base member 122 adhesively or otherwise rigidly attached to front surfaces 118 and 120 of support plate members 106 and 108, a resilient, flexible finger member 124 hingedly attached at 126 to base member 122. Finger member 124 comprises resilient arcuate portion 128 having adequate dimensions to encompass and retain a connector 114, curving to a sharp bend 130, and short resilient distal portion 132 extending upward from bend 130. Protruding portion 134 of base member 122 assists in retaining connectors 114 in place.

Support plate members 94, 106 and 108, are flat plates of suitable material such as plastic and provide means for releasably mounting communication junction boxes 92 and computer cable connectors 114 in compartment interior 70. Communication junction boxes 92 are adhesively or otherwise rigidly secured to the front surface 136 of plate 94, and cord clips 116 are similarly attached to the front surfaces 118 and 120 of plates 106 and 108. Rear surfaces 138, 140 and 142 of plates 94, 106 and 108 have cooperating releasable fasteners 144 attached thereto for releasably mounting plate members 94, 106 and 108 on rear wall 74 as illustrated in FIG. 5.

Cooperating releasable fasteners 144 comprise a complementary interlocking system such as commercially available Dual Lok manufactured by 3M or heavy duty Velcro. Fasteners 144 have planar surfaces 146 and 148 adhesively attached to respective mounting surfaces such as rear wall 74 and rear surface 140 as shown in FIG. 5, and a plurality of short projections 154, each projection having a short shaft 156 with an enlarged distal end configuration 158 for interlocking with said complementary member 154. If a conventional hook and eye material is used such as Velcro, the loop or eye material will be attached to one surface and the hook material to another. Other types of releasable fasteners may also be used.

It will now be seen that the invention provides a partition member with a compartment in the lower portion thereof. The compartment is made accessible by a hinged front wall which is flush with the front surface of the partition member, and the compartment provides an enclosed space for mounting a collection of junction boxes and data cable terminal ends. Flexibility and adjustability are provided by the cooperating releasable mounting fasteners used to mount the support plate members carrying the data cable terminal ends and the communication junction boxes. With this invention, it is possible to locate and move an entire telephone panel to any position within the compartment. Further adaptability is provided by the releasable mounting means used to retain the connected together data cable terminal ends to the front surface of support plate members. The displaceably mounted front wall provides user access to the compartment in order to make any necessary repairs or to rewire the cables.

There is described above a preferred embodiment of the invention, however, it will be understood that the invention lends itself to further modification. Variations may be made within the scope of this invention, and also changes or adaptations to details of construction may be made including such departures from the present disclosure as come within known or customary practice in the art to which this invention pertains and fall within the scope of the appended claims.

What is claimed is:

1. A space-divider wall system comprising:
   a partition member having a lower portion, a bottom edge and opposite lateral edges;
   a raceway with relative dimensions to accommodate a plurality of power, communication and data cables, and extending across the bottom edge of said partition member to one or more adjacent partition members connected edgewise to respective opposite lateral edges of said partition member, said raceway having a plurality of openings therein adapted for the ingress and egress of said cables;
   a compartment in said partition member lower portion disposed above and in communication with said raceway, said compartment having a displaceably mounted front wall for user access to the compartment, and a plurality of spaced-apart interior walls;
   an electrical junction box mounted on one of said interior walls;
   conduits carrying power cables from external sources and/or from other partition members in the wall system connected to said electrical junction box, said conduits extending from said electrical junction box to said raceway;
   a support plate member having a front and a back surface, said back surface having a cooperating releasable mounting means for releasably mounting said support plate member to one of said interior walls;
   a communication junction box fixedly attached to said support plate member;
   a plurality of communication cables connected to said communication junction box, said communication cables extending to and from said communication junction box to said raceways; and
   a plurality of data cables each having terminal ends releasably connected together, and means for releasably attaching said connected together terminal ends to the front surface of another of said support plate members, said data cables extending from said other support plate member to and from said raceway.

2. The space-divider wall system of claim 1 wherein said compartment interior walls are metal.

3. The space-divider wall system of claim 2 wherein said electrical junction box is electrically conductively attached to one of said interior walls.

4. The space-divider wall system of claim 1 including an opening in said raceway bottom adapted for the ingress or power cables from an external source.

5. The space-divider wall system of claim 4 including a conduit carrying a plurality of power cables to said electrical junction box from a source of power located external to the divider system.

6. The space-divider wall system of claim 1 wherein said conduit is a flexible conduit.

7. The space-divider wall system of claim 1 wherein said support plate members comprise flat sheets of electrically insulating material.

8. The space-divider wall system of claim 1 wherein said means for releasably attaching said data cable terminal ends comprises clip means, said clip means comprising a curved top member hingedly attached to a base member, and said top member releasably securing a data cable in position on the respective support plate member.

9. The space-divider wall system of claim 1 wherein said cooperating releasable mounting means comprises a pair of complementary, interlocking fasteners, said fasteners being adhesively connected respectively to said interior walls and a support plate member rear surface, said fasteners having means for interlocking with each other.

10. The space-divider wall system of claim 9 wherein said fastener means for interlocking comprises a plurality of closely spaced short projections having enlarged distal ends that interlock with each other.

11. The space-divider wall system of claim 9 wherein said support plate members are selectively arranged and mounted on one of said interior walls.

12. In a space-divider wall system having a plurality of partition members each having a lower portion, a bottom edge, opposite lateral edges, and a raceway extending along said bottom edge and having a bottom and opposite lateral edges with openings adapted for passage of a plurality of cables between adjacent partition members, said partition members connected edgewise to a respective lateral edge of an adjacent partition member, the improvement comprising:
- a compartment in one of said partition member lower portions, said compartment having an interior disposed above and in communication with said raceway, a displaceably mounted front wall for user access to said interior, a rear wall and a plurality of spaced-apart interior walls;
- a plurality of support plate members each having front and back surfaces, and having cooperating releasable mounting means on said back surface for releasably attaching said support plate members in said compartment interior; and
- at least one electrical junction box, a plurality of communication junction boxes and a plurality of data cables having terminal ends selectively arranged in said compartment, a plurality of conduits each carrying a plurality of electrical wires into and out of said compartment, said communication junction boxes being attached to one of said support plate members, a plurality of communication cables connected to at least some of said communication junction boxes and extending both to and from said raceway, said data cable terminal ends releasably connected together and releasably attached to another support plate member front surface, said data cables extending both to and from said raceway.

13. The space-divider wall system of claim 12 wherein said compartment interior walls and said raceway bottom wall are metal.

14. The space-divider wall system of claim 12 including an opening in said raceway bottom wall adapted for the ingress and egress of power cables from an external source.

15. The space-divider wall system of claim 12 including independent pairs of fastener means providing said cooperating releasable mounting means, each fastener having a plurality of short projections, each projection having a shaft with a distal end adapted to interlock with the other fastener of the pair.

16. The space-divider wall system of claim 12 including clip means for releasably attaching said terminal ends on the front surface of one of said support plate members, said clip means comprising an arcuate top member hingedly attached to a flat member and firmly grasping one of said data cables.

* * * * *